E. NALL & W. C. TYLER.
SKIVING MACHINE.
APPLICATION FILED MAY 13, 1914.

1,111,170.

Patented Sept. 22, 1914.
2 SHEETS—SHEET 1.

Inventors
EDWARD NALL,
AND
WILLIAM C. TYLER.

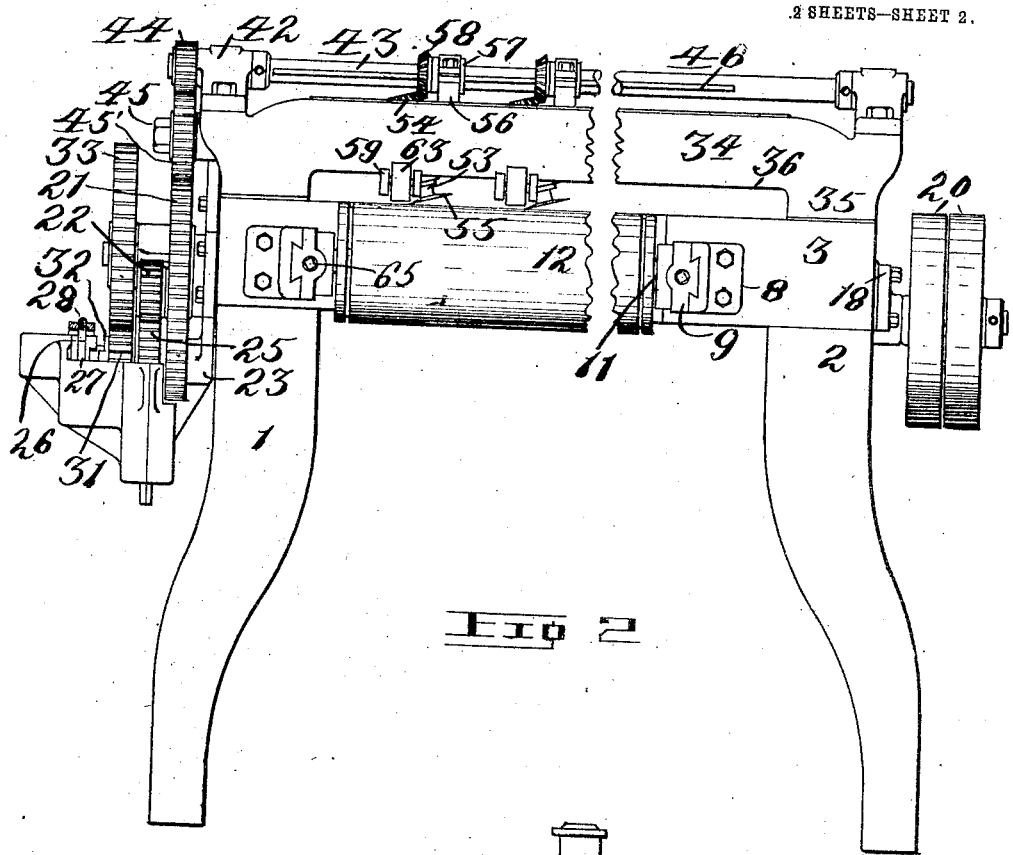
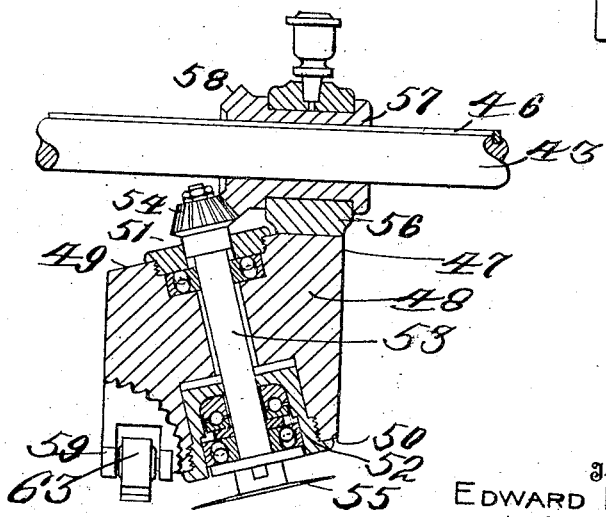

UNITED STATES PATENT OFFICE.

EDWARD NALL AND WILLIAM C. TYLER, OF AKRON, OHIO, ASSIGNORS TO THE GOODYEAR TIRE AND RUBBER COMPANY, OF AKRON, OHIO, A CORPORATION OF OHIO.

SKIVING-MACHINE.

1,111,170.  Specification of Letters Patent.  Patented Sept. 22, 1914.

Application filed May 13, 1914.  Serial No. 838,353.

*To all whom it may concern:*

Be it known that we, EDWARD NALL and WILLIAM C. TYLER, citizens of the United States, residing at Akron, in the county of Summit and State of Ohio, have invented new and useful Improvements in Skiving-Machines, of which the following is a specification.

This invention relates to machines for skiving or beveling the edges of strips of material, and is particularly adapted for cutting a plurality of longitudinal strips with skived or beveled edges from a wide continuous strip of material, from which strips the highly-resilient inner tubes of double-tube pneumatic tires are formed. Briefly, heretofore these strips have been made by hand from stock laid on a table, an operation requiring great skill in cutting the highly-resilient, tough and tacky rubber with any degree of accuracy; furthermore, the tables occupy a vast amount of space, and there is a relatively-large amount of waste due to inaccuracies of the workmen; and finally, the result of skiving by hand is not satisfactory in view of the fact that the angle or inclination of the skive or bevel does not give, under ordinary circumstances, a sufficiently wide inclined portion to make the most perfect joint.

With the foregoing and other objects in view, the invention consists in the novel construction, combination and arrangement of parts constituting the invention to be hereinafter specifically described and illustrated in the accompanying drawings, which form a part hereof wherein is shown the preferred embodiment of the invention, but it is to be understood that changes, variations and modifications can be resorted to which come within the scope of the matter hereinafter claimed.

Figure 1:
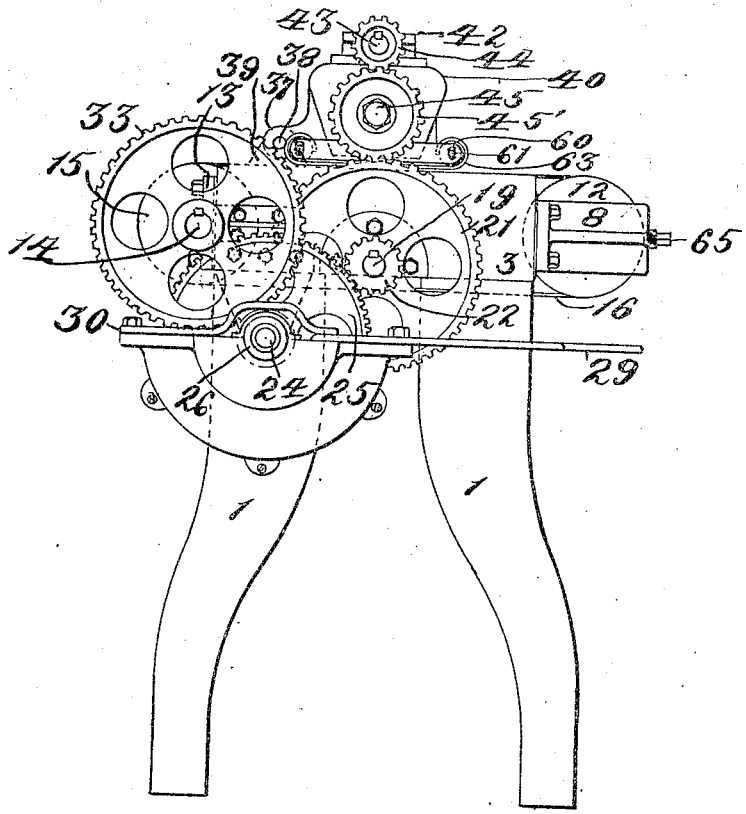
Figure 3:
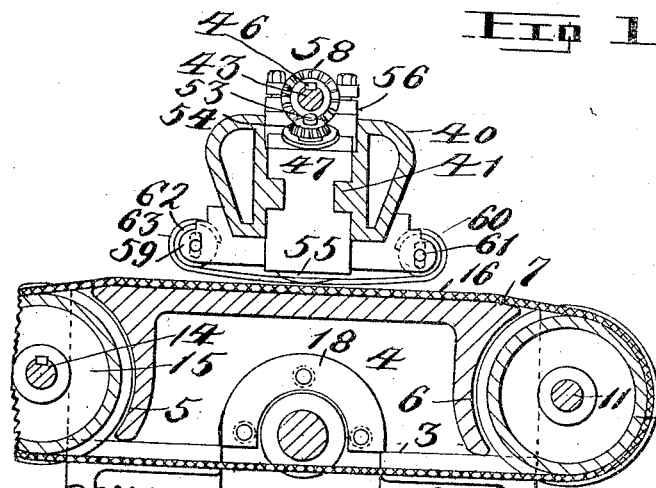
Figure 5:
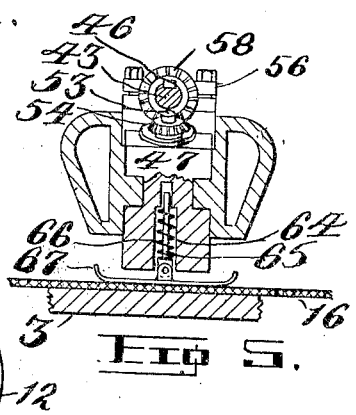

In the drawings in which similar reference numerals indicate like parts in the different figures, Figure 1, is a view in end elevation of a machine embodying this invention; Fig. 2, is a side elevation of the same looking from the right in Fig. 1; Fig. 3, is a transverse sectional view of a portion of the upper part of the machine; Fig. 4, is a vertical, central, longitudinal, sectional view of the skiving tool and its supporting mechanism; and, Fig. 5, is a view similar to Fig. 4 of a modified tool carriage.

In the description which follows, it will be assumed that the portion of the device which is shown to the right in Fig. 1 is the front of the machine, and the portion shown containing the gears is the left end of the machine and that containing the belt pulleys, the right of the machine.

The device embodies a supporting frame work comprising a pair of legs 1 and a second pair 2 and on the upper end of these pairs of legs is mounted a table 3 preferably hollowed out at 4 for the sake of lightness. The frame is provided with closed ends and the side faces of the table 3 intermediate the ends thereof are provided with concave portions 5 and 6.

The upper face of the table immediately adjacent to the concave portions 5 and 6 is slightly downwardly-inclined at 7 for a purpose to be later described. Secured to the front face of the table 3 and positioned adjacent to the concave portion 6 are a pair of horizontal brackets 8, provided in their opposing faces with dove-tailed ways to slidably hold bearings 9 having dove-tailed projections engaging the dove-tailed ways in the bracket. Mounted in the bearings 9 are the projecting ends of an axle 11 of a roller 12. The normal position of the roller 12 is such that its outer face projects inwardly into the concave portion 6 thereby positioning the roller closer to the table and the other mechanism carried thereby. On the opposite side of the table 3 and near to the ends of the concave portion 5 are a pair of brackets 13 in which are mounted a shaft 14 on which is mounted a driving roller 15 projecting into the concave portion 5. Adapted to extend around the two rollers 12 and 15 is a heavy and preferably inextensible belt 16 usually composed of rubber and fabric, one portion of which is adapted to pass transversely over the upper surface of the table 3 and the opposite portion to pass below the table. Adjusting screws 65 constitute means to shift the position of the roller 12 for maintaining the belt taut at all times when desired to cause the upper working portion of the belt to lie in snug engagement with the upper edge of the table 3.

Rotatably mounted in bearings 18 secured to the ends of the table 3 is a driving shaft 19 bearing at the right end tight and loose pulleys 20 which are adapted to receive a belt for securing rotation of the driving shaft. The left end of the driving shaft 19 bears a large gear 21 and a smaller gear 22 both fixedly secured thereto. Secured in a suitable bracket 23 on the left outer face of the table 3 is a stub-shaft 24 bearing a fixedly mounted gear 25 adapted to intermesh with the gear 22 and splined on the shaft 24 is a suitable clutch member 26 provided in the peripheral face thereof with a groove 27 to receive the nogs 28 of a bifurcated clutch lever 29 fulcrumed at 30 by which shifting motion of the clutch member is obtained. Loosely mounted on the shaft 24 is a gear 31 the hub of which is provided with a clutch-forming member 32 adapted to interengage with the clutch member 26 when the latter is shifted. Mounted on the shaft 14 is a large gear 33 adapted to intermesh with the gear 31. From this it will be seen that motion may be transmitted from the driving shaft 19 to the shaft 14 which revolves the driving roller 15 for operating the belt 16, and this motion may be interrupted or resumed through the medium of the clutch lever 29.

The mechanism for supporting the skiving tool comprises a frame 34 provided with depending portions 35 which are seated on the upper faces of the ends of the table 3 immediately above the positions occupied by the legs 1 and 2 and between these portions the inner face of the frame is cut away at 36 to provide a transversely-extending opening or arch over the belt 16. The frame 34 is provided with laterally-extending lugs 37 provided with apertures to receive pivot bolts 38, and positioned on the upper face of the table 3 are coöperating apertured lugs 39 to provide a hinged connection between the frame 34 and the table 3, to permit the frame to be swung upwardly for ready access to the belt 16 and the material carried thereby. The frame 34 comprises a pair of longitudinally-extending members 40 united at their ends to provide a longitudinally-extending slot between them. The opposing faces of the members 40 are provided with oppositely-disposed and parallel ribs 41 constituting ways. Mounted on the upper faces of the ends of the frame 34 are a pair of alined bearings 42 in which is mounted a shaft 43 which bears at its left end a gear 44. Revolubly mounted on a stud 45 attached to the left end of the frame 34 is an idler gear 45' which is adapted to intermesh with the gears 21 and 44 and transmit motion from one to the other. The shaft 43 is provided with a longitudinally-extending key 46.

Adapted to be longitudinally-shiftably mounted on the ribs 41 of the members 40 are a plurality of skiving tool-carriages denominated generally by the reference numeral 47 and as they are all similar, a description of one is believed to be sufficient, reference being directed to Figs. 3 and 4.

Each skiving tool-carriage comprises a body portion 48 provided laterally with grooves or channels to receive the ribs 41 and be thereby supported to permit its movement longitudinally of the device. A portion of the upper face of the body portion 48 is provided with an inclined portion 49 and a portion of the lower face of the carriage is similarly provided with an inclined portion 50. Mounted in the inclined portion 49 is a bearing 51 and in the lower face is a thrust bearing 52 and rotatably mounted in these bearings is an inclined shaft 53 which bears at its upper end a bevel gear 54 and at its lower end a disk-shaped skiving tool 55 provided with a cutting edge. Mounted on the horizontal portion of the upper face of the body 48 is a bearing 56 and in this bearing is rotatably mounted a sleeve 57 provided with a key-way to receive the key 46 and further provided at one end with a bevel-gear 58 adapted to intermesh with the gear 54. The lower face of the body portion 48 is also provided at each side thereof with a pair of projecting lugs 59 provided with vertically-arranged slots 60 to receive the ends of the pins 61 to permit the pins to move vertically. The pins 61 constitute axles for cylindrical blocks 62 to which is secured, by being bent partly thereabout, a pressure plate 63 the median portion of which is downwardly-convexed and is adapted to engage the material to be skived, which passes over the table 3 supported on the upper face of the belt 16, and the portion of the pressure plate 63 which engages the material is adapted to press the material against the belt at a point approximately opposite or near the point where the material is engaged by the cutting edge of the skiving tool 55.

The operation of the device is as follows: Power is applied through the medium of a belt to one pulley 20 on the shaft 19. This motion is transmitted to the belt as has been before described, and the rotation of the shaft 19 induces the rapid rotation of the shaft 43 which rotates each of the sleeves 57, thereby operating each skiving tools 55 at high speed. The material, usually in continuous strips, is fed over the upper face of the belt 16 and is cut into strips having skived or beveled edges by the skiving knives 55. It will be noted that the transverse positions of the skiving knives may be altered at will and from this it will follow that the strips may be arbitrarily changed. Should it at any time be necessary to stop the operation of a skiving-tool without interrupting the operation of the others, the desired carriage is shifted to the right in Fig. 2 until the sleeve 57 carried thereby is moved out of engagement with the key 46. While only two skiving-tool-carriages are shown in Fig. 2, no limitation thus exists as to the number employed, thereby making the device adaptable for simultaneously cutting a plurality of strips.

In Fig. 5 is shown a modification of the device shown in Fig. 3, the modification having reference to the means for holding the material to be skived in firm contact with the traveling belt 16. In this modification the lower face of the body portion 48 of the tool-carriage is provided with a vertical recess 64 in which is mounted a vertically-shiftable pin 65 surrounded by a coiled spring 66 the normal tendency of which is to force the pin downwardly.

Pivotally secured to the lower ends of the pin 64 is a pressure foot 67 the object and function of which is to press the material downwardly into snug contact with the belt 16. The function of the pressure foot 67 is precisely the same as the function of the pressure plate shown in Fig. 3 and a further description of the same is believed to be unnecessary. The other mechanism of the skiving-tool-carriage shown in Fig. 5 is identical with the mechanism shown in Fig. 3.

We claim:—

1. A skiving machine comprising a supporting table, driving and idler rolls mounted on opposite sides thereof, a traveling belt on said rolls arranged to move over the upper face of said table, a frame positioned above said traveling belt, a carriage adjustable on said frame longitudinally thereof, a knife carried by said carriage and arranged to skive or bevel material fed over said table by said belt, and a pressing member arranged to frictionally engage the upper surface of said material to hold said material in position during the skiving operation.

2. A skiving machine comprising a supporting table, driving and idler rolls on opposite sides thereof, a traveling belt on said rolls arranged to move over the upper face of said table, a frame positioned above said belt, a carriage on said frame adjustable longitudinally thereof, a skiving tool mounted on said carriage and a pressure member arranged to engage material fed by said belt to said skiving tool at a point near where said material is engaged by said skiving tool for holding said material in frictional engagement with said belt.

3. A skiving machine comprising a supporting table, driving and idler rolls on opposite sides thereof, a traveling belt on said rolls arranged to move over the upper face of said table, a shiftable carriage mounted above said belt, an inclined rotary skiving tool mounted on said carriage, and a yieldable pressure member arranged to engage material fed to said tool by said belt at a point where said skiving tool engages said material for holding it in firm contact with said belt.

4. A skiving machine comprising a supporting table, driving and idler rolls mounted on opposite sides thereof, a traveling belt on said rolls arranged to move over the upper face of said table, supporting means mounted above said traveling belt, a carriage on said means, said carriage being provided with a skiving tool adapted to skive or bevel material fed to said tool by said belt, a projecting lug on each side of said carriage, and a yieldable member secured to said lugs adapted to frictionally engage the material fed by said belt to said skiving tool.

5. A skiving machine comprising a supporting table, driving and idler rolls mounted on opposite sides thereof, a traveling belt on said rolls arranged to move over the upper face of said table, a supporting frame above said belt, a carriage adjustable on said frame longitudinally thereof and provided with a rotary skiving tool for skiving or beveling material fed to said tool by said belt, and a yieldable member carried by said carriage vertically movable with respect to said carriage and adapted to frictionally engage the material fed by said belt to said skiving tool.

6. A skiving machine embodying a moving platform constituting a supporting medium for material to be skived, a shiftable carriage positioned above said platform, a rotary skiving tool supported thereby and adapted to engage the material on said platform for the skiving operation, and a pressure member engaging the material on said medium at a point near the point of engagement of said skiving tool with said material.

7. A skiving machine embodying a moving platform constituting a supporting medium for material to be skived, a shiftable carriage positioned above said platform, a rotary skiving tool supported thereby and adapted to engage the material on said platform for the skiving operation, said skiving tool being arranged at an inclination with respect to said platform, and a pressure member engaging the material on said medium at a point near the point of engagement of said skiving tool with said material.

8. A skiving machine embodying a belt constituting a traveling platform to support the material to be skived, skiving tools operating to make parallel oblique cuts in said material extending in the same direction as the line of travel of the material to thereby divide the material into a plurality of strips extending longitudinally thereof, and pressing means adapted to engage the upper face of the material adjacent to the working edges of said skiving tools for holding said material snugly in engagement with the moving platform.

In testimony whereof we have hereunto set our hands in presence of two subscribing witnesses.

EDWARD NALL.
WILLIAM C. TYLER.

Witnesses:
ROSE M. LE MIEUX,
ANNA J. GILHOOLY.